Nov. 26, 1968  A. P. RUTH  3,412,674
BROILER

Filed Aug. 11, 1966  2 Sheets-Sheet 1

Arthur P. Ruth
INVENTOR.

BY Charles E. Lightfoot
ATTORNEY

Nov. 26, 1968   A. P. RUTH   3,412,674
BROILER
Filed Aug. 11, 1966   2 Sheets-Sheet 2
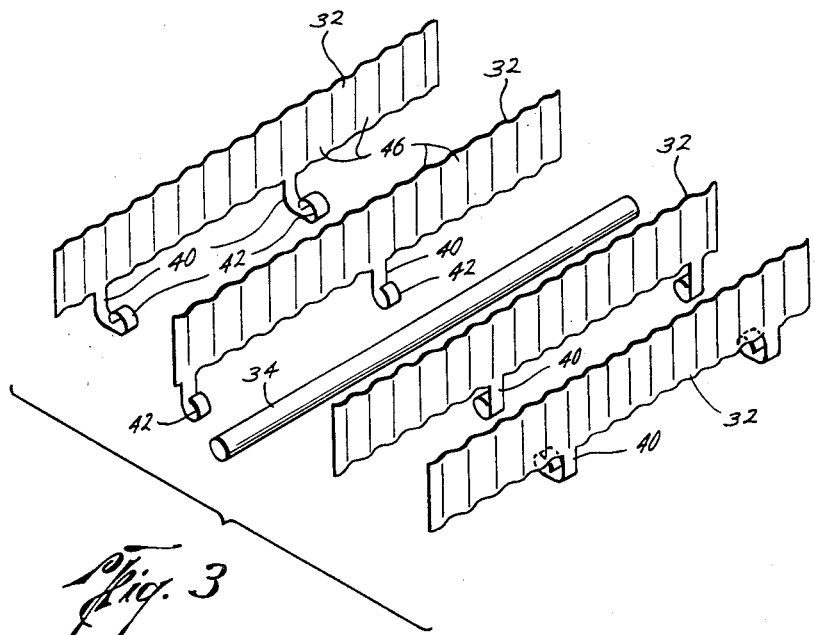
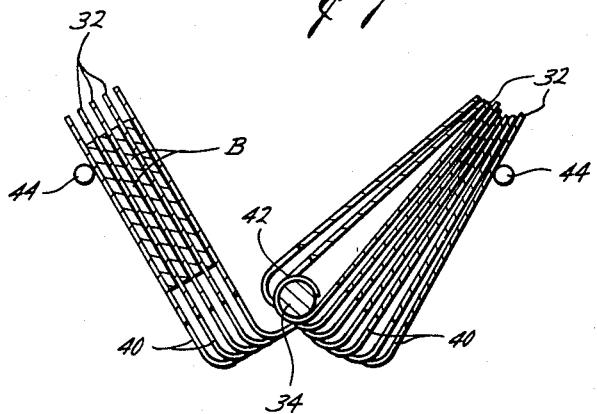
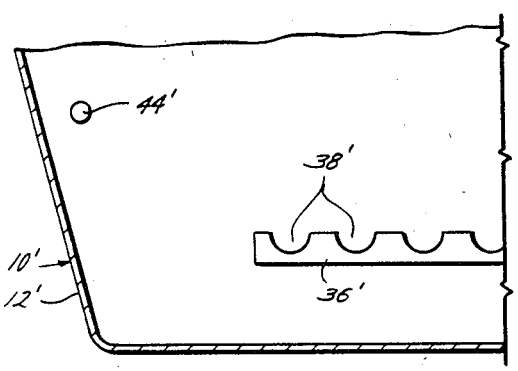
Arthur P. Ruth
INVENTOR.
BY Charles E. Lightfoot
ATTORNEY

United States Patent Office 3,412,674
Patented Nov. 26, 1968

3,412,674
BROILER
Arthur P. Ruth, 5025 Jensen Drive, Houston, Tex. 77026
Filed Aug. 11, 1966, Ser. No. 571,876
6 Claims. (Cl. 99—402)

ABSTRACT OF THE DISCLOSURE

Cooking apparatus particularly useful for broiling strip-like articles of food and having a pan in which a plurality of leaf-like elements are rotatably supported on a removable shaft disposed parallel to and above the bottom of the pan for swinging movement into and out of superposed relation to hold the food between them. The invention includes a cover for the pan in which heating means is supported to heat the food from above.

---

This invention relates to the cooking of food by broiling, and more particularly to a broiler for use in the cooking of articles of food such as bacon strips for the purpose of maintaining the same in a flat, uncurled condition.

In the broiling or frying of articles of food, such as strips of bacon, or the like, there is a tendency for such articles to curl up, which often results in uneven cooking of the food and an undesirable appearance of the same. Moreover, in the cooking of food of this kind in the usual manner, as by placing the strips in a frying pan the melted fat is not drained away and accumulates rapidly, so that the food is left in a greasy condition.

The present invention has for an important object the provision of a broiler which is constructed for the cooking of articles of food in the form of strips which are maintained separate and in a flat condition.

Another object of the invention is to provide a broiler which is designed to hold a plurality of strip-like articles of food in separated and flat condition and to allow the draining away of the melted fat produced during cooking so that the food may be cooked to a crisp condition free from excess fat.

A further object of the invention is the provision of a broiler having means for supporting strip-like articles of food in a separate and flat condition and which is of simple design and rugged construction and which is also easily cleaned.

Briefly described the broiler of the invention comprises a receptacle or pan within which a plurality of generally leaf-like elements are hingedly supported in parallel relation to receive between them strip-like articles of food, such as strips of bacon, whereby the strips are held in separated and flat condition and in a position to permit the draining away of fat during the cooking of the same.

The above and other obvious advantages of the invention will be apparent from the following detailed description of a preferred embodiment of the same, when considered in conjunction with the annexed drawings, wherein—

FIGURE 3 is a composite, perspective view showing the food supporting means of the broiler as illustrated in FIGURE 1 in disassembled condition;

FIGURE 4 is an end elevational view, partly in cross-section, of the food supporting assembly of the invention illustrating the manner in which the strip-like articles of food are inserted in or removed from the broiler; and FIGURE 5 is a fragmentary, cross-sectional view, similar to that of FIGURE 1 illustrating a somewhat modified form of the pan portion of the invention.

Figure 1:
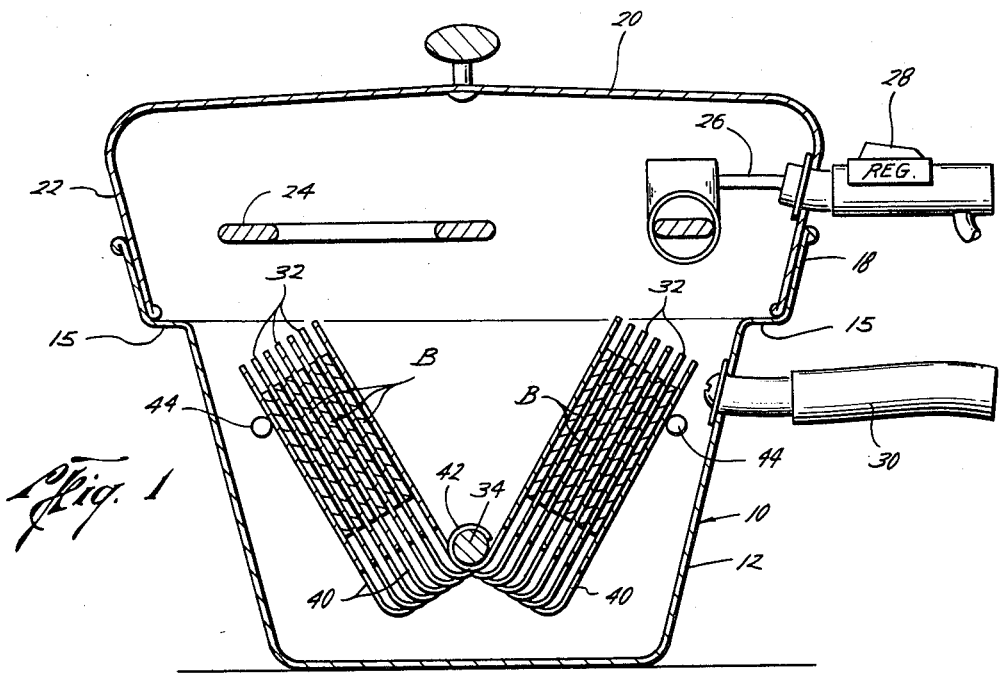
FIGURE 1 is a vertical, central, cross-sectional view of a preferred embodiment of the invention, showing the same with strip-like articles of food disposed therein in position for cooking.
Figure 2:
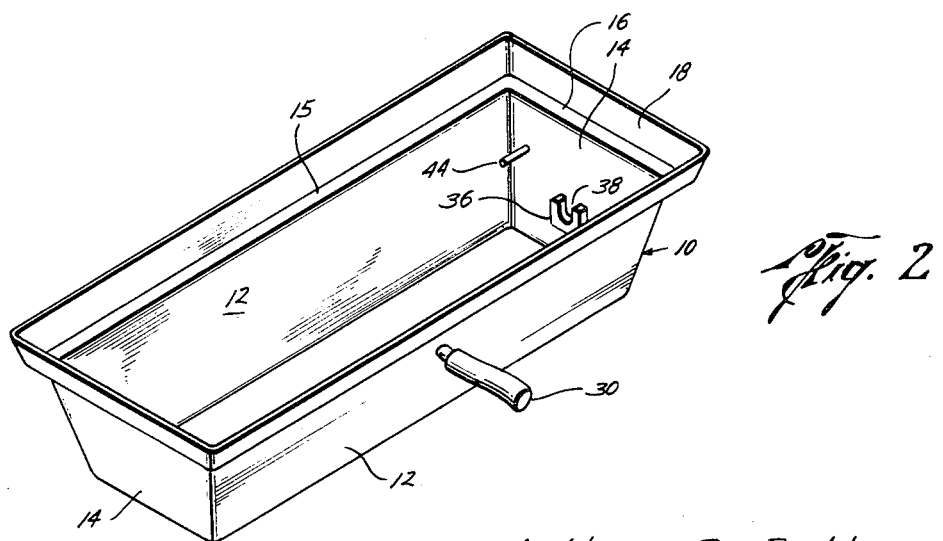
FIGURE 2 is a perspective view, on a somewhat reduced scale, of the bottom or pan portion of the broiler, with the cover and the food article supporting means removed therefrom.

Referring now to the drawings in greater detail the broiler of the invention includes a receptacle or pan portion, generally designated 10, which in the present illustration is of generally rectangular configuration, with upwardly flaring side and end walls 12 and 14, respectively. The side and end walls are formed with outwardly extending horizontal portions 15 and 16 forming an internal upwardly facing shoulder or ledge extending about the pan near the top of the same, and the walls are then extended upwardly from this shoulder to form an upwardly flaring rim 18.

The pan is provided with a cover 20 having a downwardly extending rim or flange 22 which fits into the rim 18 and rests upon the shoulder 15 when the cover is in position on the pan. As shown in FIGURE 1, the cover 20 may be provided with electrical heating coils or elements, such as that seen at 24, suitably connected to electrical conductor means 26 of the usual type through which electrical current from any convenient source may be supplied to the coils under the control of current regulating means, designated 28 of any convenient type, whereby the contents of the pan may be heated.

The pan 10 is provided with a handle 30.

The food article supporting assembly of the invention comprises a number of elongated, leaf-like elements 32, which are hingedly supported adjacent their lower edges on a centrally located shaft 34 extending longitudinally in the pan 10 between the end walls of the same. The shaft 34 is supported at its ends in end support lugs 36 attached to or formed as a part of the end walls 14 of the pan, and which have upwardly opening notches 38, in which the ends of the shaft are removably received to hold the shaft in an elevated position about the bottom of the pan.

The leaves or plates 32 are each provided with laterally extending projections or hinge lugs 40 at their lower edges, which are formed with curved, hook shaped portions 42 through which the shaft 34 is extended to hingedly connect the leaves or plates to the shaft. The projections 40 of each plate are positioned in longitudinally offset relation to the projections or tabs of the other leaves or plates and the tabs of the plates are of different lengths, so that the leaves or plates will be supported in parallel relation on the shaft and are independently rotatable about the shaft to allow the plates to be swung apart for the positioning therebetween of articles of food of a strip-like nature, such as strips of bacon.

The pan is provided with spaced apart pins 44 on its end walls positioned for engagement with the outer ones of the leaves or plates 32 to limit the swinging movement of the leaves and to hold the leaves in an upwardly extending position in the pan. Thus, the leaves may be swung individually from the position shown at the right in FIGURE 4 to the position seen on the left in that figure, and as each leaf is swung to the left a strip of bacon B may be placed against its right hand face and the next leaf then swung over to the left to hold the strip between the leaves. As seen in FIGURE 1 the leaves with the strips held between them may be positioned, if desired, with half of the leaves on the right and the other half of the leaves located to the left to distribute the strips of bacon symmetrically in the pan.

With the strips thus disposed between the leaves the strips will be held by the leaves and the tabs 40 in an elevated position in the pan and will be maintained in a flat condition during cooking. The cover 20 may then be placed on the pan and the strips broiled by the heating coils 24.

If desired the pan may be placed in an oven for heating to broil the bacon strips instead of cooking the strips by means of the heating coils 24 in the cover 20.

The leaves or plates 32 are preferably formed with vertically extending corrugations 46, as best seen in FIGURE 3, forming passageways through which the melted fat from the cooking of the strips may more readily flow downwardly from the strips as they are cooked. It will be apparent that the melted fat will be drained away from the strips into the bottom of the pan during cooking, thus leaving the strips in a relatively greaseless and crisp condition when cooked.

The cooked strips may be readily removed in a flat condition by swinging the leaves one at a time away from each other and lifting out the strips.

Under some conditions it may be desired to broil some of the bacon strips to a more crisp condition than others thereof, during the same cooking operation, and this may be accomplished by placing some strips between pairs of leaves while others are placed between a single pair of strips so that the strips are held between different thicknesses of metal during cooking.

A somewhat modified form of the cooking apparatus of the invention is illustrated in FIGURE 5, wherein the shaft 34 of the food article supporting assembly may be positioned in selected ones of notches 38' of support lugs 36' on the end walls of a pan 10' of increased width, whereby the leaves or plates 32 may be held at different angles to the horizontal by the pins 44' of the pan and a larger number of leaves or plates may also be accommodated.

For the purpose of cleaning the apparatus the food article supporting assembly may be removed as a unit from the pan by lifting out the shaft 34 and the assembled leaves 32 therewith, whereupon the shaft may be removed from the hinge projections of the leaves to disassemble the leaves for washing.

It will thus be seen that the invention constructed and used as described above provides a broiler for articles of food of strip-like character, which holds the strips in a flat condition and allows the draining away of fat from the same during the cooking operation.

The invention is disclosed herein in connection with a particular embodiment of the same, which is intended by way of illustration only, and it will be understood that the construction and arrangement of the parts is capable of variation within the spirit of the invention and the scope of the appended claims.

Having thus clearly shown and described the invention what is claimed as new and desired to secure by Letters Patent is:

1. Cooking apparatus for broiling strip-like articles of food comprising a pan, and a plurality of plate-like elements, a common shaft upon which said elements are rotatably supported along their lower edges for swinging movement into and out of superposed, parallel relation, means on the pan positioned for engagement with end portions of the shaft to removably support the shaft in the pan in parallel relation to and at a location spaced above the bottom of the pan with said elements extending upwardly from the shaft, heating means, and means for removably supporting the heating means on the pan above the elements.

2. The cooking apparatus as claimed in claim 1 wherein each of said elements is formed with longitudinally spaced hinge lugs extending laterally from the plane of the element along its bottom edge, the lugs of one element being offset longitudinally relative to and of longer lateral extent than the lugs of another of said elements.

3. The cooking apparatus as claimed in claim 1 including means on the pan positioned for engagement with said elements to limit the swinging movement of the elements.

4. The cooking apparatus as claimed in claim 1 wherein means is provided on the pan positioned for engagement with said shaft to support the shaft at a selected one of the plurality of laterally spaced locations in the pan.

5. The cooking apparatus as claimed in claim 1 wherein said pan is formed with a horizontal ledge extending inwardly from the walls of the pan below the top of the pan, said apparatus and said supporting means for said heating means includes a cover shaped to rest upon said ledge to close the pan when positioned thereon.

6. The cooking apparatus as claimed in claim 5, wherein the side walls of the pan are extended upwardly from said ledge to form a rim portion extending about the top of the pan, and said supporting means for said heating means includes a cover formed with a downwardly extending peripheral wall positioned for engagement with the inner face of said rim portion to close the pan.

References Cited

UNITED STATES PATENTS

| | | | |
|---|---|---|---|
| 2,355,153 | 8/1944 | Gomersall | 99—391 |
| 2,652,766 | 9/1953 | Cralle | 99—402 XR |
| 2,682,602 | 6/1954 | Huck | 219—435 XR |
| 2,760,428 | 8/1956 | Boyajian | 99—402 XR |
| 2,895,406 | 7/1959 | Randolph | 99—426 XR |
| 2,967,474 | 1/1961 | Ford | 99—427 XR |
| 3,207,059 | 9/1965 | Hirons | 99—349 |
| 3,243,576 | 3/1966 | Lee et al. | 219—403 XR |

WALTER A. SCHEEL, *Primary Examiner.*

JOHN M. NEARY, *Assistant Examiner.*